Figure 1:
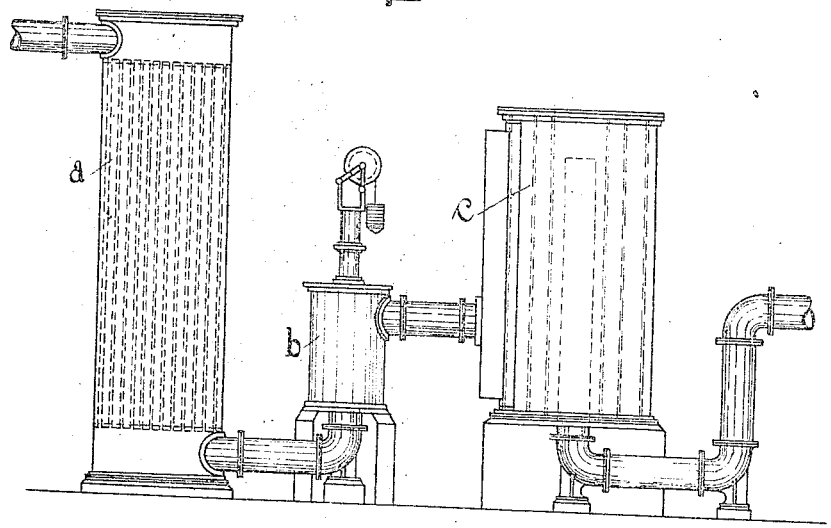

No. 862,976. PATENTED AUG. 13, 1907.
H. KOPPERS.
PROCESS OF OBTAINING AMMONIA, &c.
APPLICATION FILED OCT. 14, 1904.

3 SHEETS—SHEET 1.

Witnesses:
Arthur Junger
William Schulz

Inventor:
Heinrich Koppers,
By Hauff v Briesen Atty

No. 862,976. PATENTED AUG. 13, 1907.
H. KOPPERS.
PROCESS OF OBTAINING AMMONIA, &c.
APPLICATION FILED OCT. 14, 1904.
3 SHEETS—SHEET 3
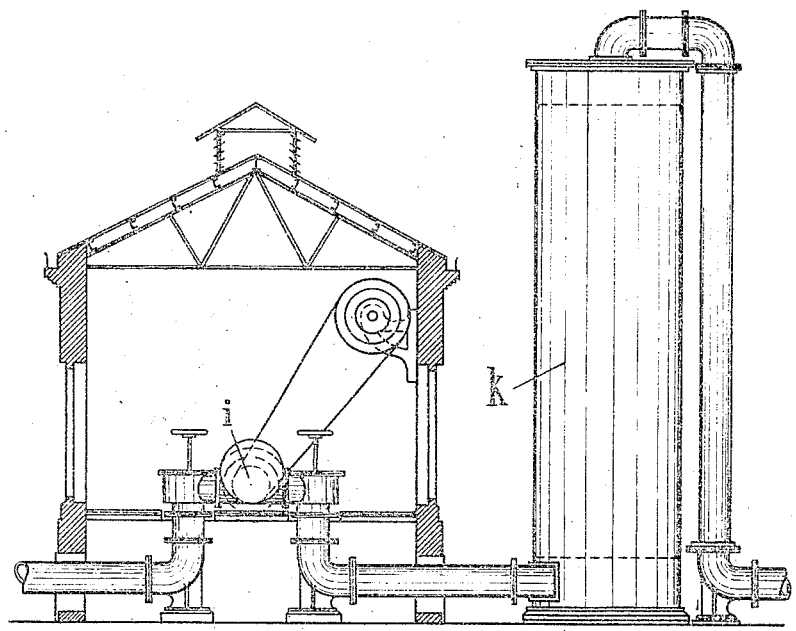
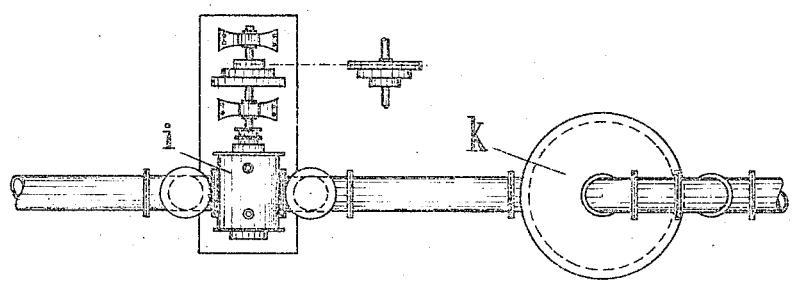

UNITED STATES PATENT OFFICE.

HEINRICH KOPPERS, OF ESSEN-ON-THE-RUHR, GERMANY.

PROCESS OF OBTAINING AMMONIA, &c.

No. 862,976.    Specification of Letters Patent.    Patented Aug. 13, 1907.

Application filed October 14, 1904. Serial No. 228,488.    REISSUED

*To all whom it may concern:*

Be it known that I, HEINRICH KOPPERS, a citizen of Germany, residing at Essen-on-the-Ruhr, Germany, have invented an Improved Process of Obtaining Ammonia and Tar, of which the following is a specification.

Hitherto the gases obtained from the dry distillation or gasification have been treated generally speaking in accordance with two methods for the purpose of separating the by-products, tar and ammonia. In accordance with the first process the gases were first of all cooled down to atmospheric temperature, thus condensing the tar and gas water, the ammonia remaining in the gas being washed out by means of water or acid. This treatment yielded a pure tar but it was necessary to convert the liquid containing the ammonia into a marketable product requiring steam or the reintroduction of heat and so forth. The other method of obtaining the by-products consists in either not cooling the gases at all or only to a very small extent and then treating them with acid liquors or acids. This process gives impure products, the tar is partially decomposed and the ammonium sulfate is not obtained free from tar. Both processes present the important defect that the two principal constituents, tar and ammonia must undergo common processes which are only directed to obtaining one of the substances and which have prejudicial effects as regards the other.

The object of this invention is to obtain the by-products tar and ammonia in a more simple and economical manner than heretofore purely and quantitatively, and the principal feature of the said invention is that the separation of each product takes place at the temperature best adapted therefor, the separation of the tar being effected before the ammonia is obtained.

The process is based upon observations and experiments which have been undertaken. As is known, tar is a mixture of organic bodies of the most various natures, and of such a composition that approximately 95% to 97% of the constituents boil above 100° Celsius. New experiments have demonstrated that gases of dry distillation, such as coke oven and retort gas may be cooled far below 100° Celsius without water condensing. The dew point for retort gas was 72° Celsius, that of coke oven gas 85° Celsius (barometer at 760 millimeters). The difference arose from the higher percentage of water in the coke oven gas, as coking coal in contradistinction to gas coal is treated with a certain amount of water (say 14%). Further experiments have shown that the tarry constituent in the gas may be separated at temperatures of 75° to 100° Celsius. By the treatment of the raw gas at temperatures which lie slightly above the dew point for separation of water or at that point, the tar is separated into one part, about 95% of the whole that is to say the tar properly so called, which boils above 100° Celsius and which may consequently be condensed and separated mechanically pure, and into a smaller portion (organic bodies, principally heavy benzol and naphthalene) which remains in the gas in the form of vapor. The gas freed from tar which is thus obtained presents a very great similarity to the gases evolved in distilling ammoniacal liquor and may therefore be treated directly for ammonium sulfate in exactly the same way as these latter. It contains organic constituents and gases dissolved, which enter the acid with the steam.

For the purpose of obtaining the sulfate directly the gas is conducted into sulfuric acid, or into a bath with acid sulfate liquor, which with the object of obviating any condensation from the gas is kept at appropriate temperature the concentration of the bath being about 30–33° Baumé. The condensation of the water carried in the form of vapor is prevented owing to the fact that the temperature of the gas is maintained above the dew point which has been previously ascertained, or in other words, that the gas is superheated, so that vaporization is able to take place even in the acid bath. After the separation of the ammonia the gases leave the saturation chambers and are cooled to atmospheric temperature, when the water vapor becomes deposited for the first time, this condensate being a soft pure water which can be made use of. In this process the gases themselves do not suffer in their composition in any way, so that they may be treated to form benzol, illuminating gas and so forth, as usual. Now in order that the residuum of organic bodies referred to above and which has not separated in the cooling of the steam to the dew point and the treatment for the separation of the tar may not be destroyed in the sulfuric acid, weak acid liquors of constant strength as far as possible are employed for saturation, which constancy is insured owing to the fact that acid is supplied continuously as required and the salt separated is likewise withdrawn continuously. If the quantity of acid supplied corresponds exactly to the quantity of acid combined with the salt, the desired constancy in the degree of acidity is obtained. This bath, which in the manner explained is only able to attain a predetermined degree of concentration, does not attack the tar, especially the more readily boiling parts. The residuum of organic constituents therefore passes through the process unaltered, is separated with the water and added to the tar which was separated earlier. Any already thickened tar which has entered the saturation bath may be removed therefrom by means of any suitable mechanical device such as a pump, injector or the like.

The gas, as it comes from the coke oven, gas retort or regenerator contains ammonia partially bound with acids. This part of the ammonia is separated as a thin saline solution with the tar and some water before the passage through the saturation apparatus. It may be dealt with in numerous ways. Thus for example it might first of all be treated like gas liquor for obtaining ammonia. Another way is to pump back this saline solution for the time being into the collecting main until it is sufficiently concentrated to flow into the saturation vessels. The gases have such a high temperature in the collecting main on the ovens that the excess heat may advantageously be employed for re-vaporizing the condensed water which is produced on the way to the saturation apparatus.
In many cases, in accordance with the kind and quantity of the condensate, this enriching of the distillation gases which leave the oven or the collecting main and which is necessitated by this direct transmission of heat, with water vapor may not appear to be advantageous, as by this means the temperature of complete saturation and with it the temperature at which the separation of the tar has to take place is raised. In such a case it would appear to be advisable to treat the condensate in such a manner that a relative increase of steam in the gas is avoided. For example, the collecting main might be provided with a second jacket, the condensate being temporarily stored in the intermediate space. The vapor obtained in this manner or by a similar indirect heating is conducted into the gas main in front of the saturating chamber, without being passed through the tar separator, and here the raising of the dew point is without importance.

If the condensates are very small, care is taken that the gases freed from tar are sufficiently heated and the condensates are allowed to flow in thin streams into the saturation apparatus where they vaporize.

As already explained, it is nesessary for the purpose of efficient tar separation to cool the gas to a temperature at which the saturation with steam is complete (at normal atmospheric pressure this is from 70° to 85° Celsius). Now in order to obviate the great uncertainty which arises in keeping to these temperatures, the procedure may be as follows: The temperature of the raw gas is lowered as much as is necessary for an efficient tar separation, without however departing too much from the dew point for water saturation. After the separation has taken place the temperature of the gas is again raised to such an extent as to permit of ammonium sulfate being directly produced from the saline solution (which invariably contains like quantities of free sulfuric acid) with the highest efficiency and excluding as far as possible any condensation during the saturation process. As in this process for separating the tar the gases may be cooled, while obviating the uncertainty already referred to, down to, or even below, the dew point, it is also possible to again raise the temperature for the saturation process to such an extent that not only does condensation not occur, but that even vaporization takes place in other words, to superheat the gases. To this end, having regard to the great difference of temperature present, the hot gases coming from the ovens may themselves be used as the source of heat, or heating gas, heat radiating from the walls of the ovens, waste gases or the like may be employed.

The modification described above is especially applicable to the introduction of the process in the case of existing plant, where the gases have hitherto been largely cooled (15° Celsius) and after the separation of the tar submitted to the usual scrubbing processes. Omitting this scrubbing the gases, immediately they have been freed from tar, are raised to a temperature of say 85° Celsius by means of the heat of the raw gases, or to such a temperature as is best adapted for direct formation of ammonium sulfate in accordance with the principles of this invention. In a manner exactly analogous to the process described they are then conducted into the saturation bath and thereupon cooled to atmospheric temperature. The condensate which is formed at the first cooling is preferably converted into ammonia separately.

The process for obtaining the by-products with direct production of sulfate, after separation of the tar has taken place which forms the basis of this invention, is characterized broadly by the fact that, the systematic separation of these products is effected at the temperatures most suitable therefor respectively, whereby a temporary transition of temperature, for the purpose of separating the tar, down to or even below the dew point for the time being for water saturation, may be counterbalanced by a subsequent supply of heat. In doing this an essential feature is the bringing through the process of the residuum of organic bodies which has not been separated, while avoiding decomposition by employment of constant saturation in the acid bath, the regulated supply of fresh acid preventing the attack of organic bodies. Equally important is the subsequent treatment of the saline solution which has been referred to and which takes place by the separation of the ammonia bound with acids, in one or other of the manners explained.

In practice the process described permits of obtaining the by-products almost cost free, as the heat inherent in the gases, which has hitherto been turned to no account, is sufficient for the direct separation of the solid marketable ammonium salt, tar and salt being obtained pure and quantitatively. What has hitherto been a necessary evil in obtaining ammonia, namely the separate introduction of quantities of fresh water with unnecessary consumption of heat and the formation of a large quantity of waste water, is wholly obviated, as only the condensation water which for other reasons must be vaporized from the coal goes through the process, without necessitating a special supply of heat. This condensation water is, however, obtained pure and is a perfectly soft water, which can be made use of.

Figure 2:
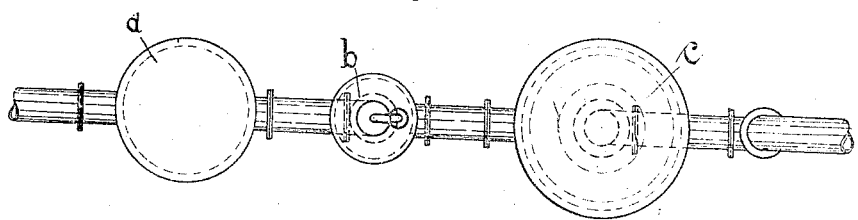
Figure 3:
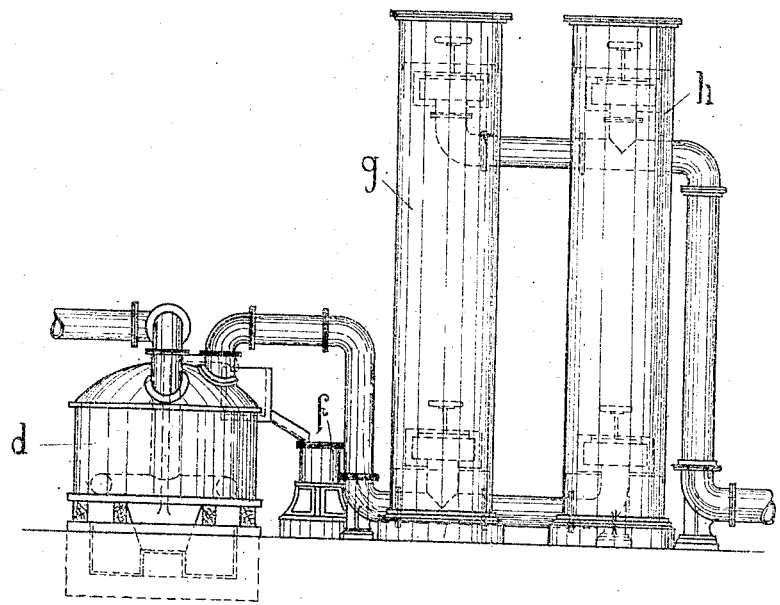
Figure 4:
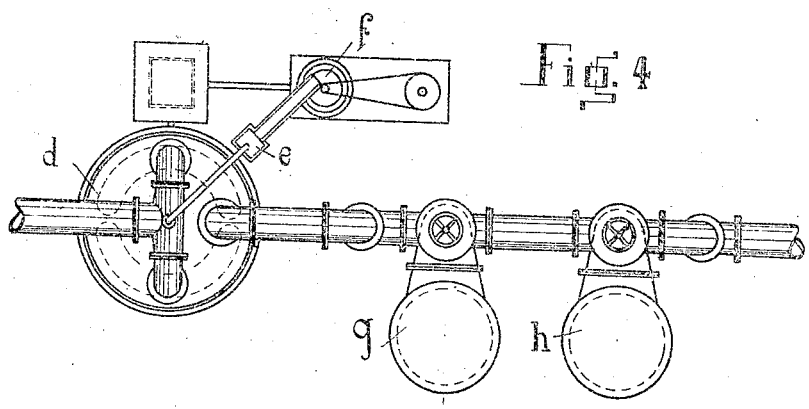

In the accompanying drawing is represented by way of example an installation for carrying this process into practice by mounting in series single apparatus and Figures 1, 3 and 5 are to be regarded as an elevation following one upon the other, and Figs. 2, 4 and 6 as a similar plan. The raw gases coming from the collecting main first of all enter the cooler $a$, where they are cooled to about the dew point for water saturation. That portion of the tar which condenses at about 100° Celsius then condenses in form of a mist. For separating this condensed tar, which is suspended in the gas analogous to fog floating in the air, the gas containing the floating tar-particles is first passed through a tar separator and then through filter $c$. This latter is a vertical cylinder with internal concentric perforated annular jackets (three for example) which serve for the reception of the filtering material. The gas enters the outer annular chamber and filters first through a coarse layer of coke and then through a fine layer, the tar separated in the filter and also any water that there may be, flow to the bottom; the contents of the filter may be drawn off below. The gas freed from tar in this manner passes to the saturation apparatus $d$. This is preferably a closed vessel provided with a lead lining and is partially filled with dilute acid. A recess or cavity in the middle of the bottom serves for the reception of the salt which is precipitated in the form of fine crystallized particles floating in the liquid. Through the cover of the saturation apparatus two pipes descend to the bottom of the vessel where they are bent into semi-circular parts very finely perforated for the discharge of the gas. An injector $e$ or equivalent device raises the salty condensate which has collected at the bottom directly into the centrifugal drier $f$. The liquor issuing therefrom flows back automatically into the saturation apparatus. The fresh acid is supplied continuously to saturation apparatus $d$, in regulated quantities, so that the bath does not exceed a predetermined degree of concentration, so that, as already explained, the residuum of organic bodies still accompanying the gas is not decomposed. An appropriate mechanical device is provided for the removal of any already condensed tar constituents which may have reached the acid bath. This residuum of organic bodies reaches the coolers $g$ and $h$ with the gas, and here vigorous cooling takes place. The condensate consists of pure water with small quantities of organic substances which separate from the water and which may be conducted to the other products of condensation which were previously separated in a warm state. The water itself is a perfectly soft water, which can be made use of. After tar and ammonia have been obtained in the manner described the gas may be conducted by the exhauster $i$ into the benzol scrubber $k$, the further treatment there taking place in the usual manner.

What I claim is:

Process of obtaining ammonia and tar from the gases of the dry distillation or gasification of fuels, consisting in cooling said gases to approximately the dew point of water saturation, so as to condense the tar in the form of a mist floating in the gases, passing the gases through a tar separator, withdrawing the tar therefrom, superheating the gases freed from tar, conducting said gases to an acid saturation bath which is kept at a uniform concentration by means of a constant supply of acid and a constant withdrawal of the deposited salt, conducting the withdrawn salt to a drier, and returning the resulting liquor to the saturation bath, substantially as specified.

HEINRICH KOPPERS.

Witnesses:
WILLIAM ESSENWEIN,
PETER LIEBER.